(12) United States Patent
Razak

(10) Patent No.: US 11,572,182 B2
(45) Date of Patent: *Feb. 7, 2023

(54) PREVENTING ELECTRICAL BREAKDOWN

(71) Applicant: ROLLS-ROYCE plc, London (GB)

(72) Inventor: Ahmed My Razak, Bristol (GB)

(73) Assignee: ROLLS-ROYCE PLC, London (GB)

( * ) Notice: Subject to any disclaimer, the term of this patent is extended or adjusted under 35 U.S.C. 154(b) by 136 days.

This patent is subject to a terminal disclaimer.

(21) Appl. No.: 15/984,555

(22) Filed: May 21, 2018

(65) Prior Publication Data

US 2018/0342923 A1 Nov. 29, 2018

(30) Foreign Application Priority Data

May 24, 2017 (GB) ...................................... 1708297

(51) Int. Cl.
| | | |
|---|---|---|
| *B64D 27/24* | (2006.01) | |
| *F04D 25/06* | (2006.01) | |
| *F01D 15/10* | (2006.01) | |
| *B64D 33/00* | (2006.01) | |
| *H02K 5/124* | (2006.01) | |
| *B64D 27/10* | (2006.01) | |
| *B64D 27/02* | (2006.01) | |
| *F04C 2/344* | (2006.01) | |

(52) U.S. Cl.
CPC ............ *B64D 27/24* (2013.01); *B64D 33/00* (2013.01); *F01D 15/10* (2013.01); *F04C 2/344* (2013.01); *F04D 25/06* (2013.01); *H02K 5/124* (2013.01); *B64D 27/10* (2013.01); *B64D 2027/026* (2013.01)

(58) Field of Classification Search
CPC ............ B64D 27/24; B64D 33/00; B64D 2027/026; H02K 5/124; F04D 25/06
See application file for complete search history.

(56) References Cited

U.S. PATENT DOCUMENTS

| 3,681,628 | A | * | 8/1972 | Krastchew | ............. | H02K 9/005 |
| | | | | | | 310/54 |
| 4,662,826 | A | * | 5/1987 | Nitta | ....................... | F04B 37/10 |
| | | | | | | 417/206 |
| 5,977,645 | A | | 11/1999 | Glennon | | |

(Continued)

FOREIGN PATENT DOCUMENTS

| CN | 201428517 Y | 3/2010 |
| CN | 103459853 A | 12/2013 |

(Continued)

OTHER PUBLICATIONS https://theflyingengineer.com/flightdeck/pw1100g-gtf/, retreieved Feb. 3, 2020 (Year: 2014).
Feb. 6, 2020 Office Action issued in U.S. Appl. No. 15/984,557.
Great Britain Search Report dated Nov. 23, 2017, issued in GB Patent Application No. 1708289.2.
Great Britain Search Report dated Nov. 23, 2017, issued in GB Patent Application No. 1708297.5.

(Continued)

*Primary Examiner* — Philip E Stimpert

(74) *Attorney, Agent, or Firm* — Oliff PLC

(57) ABSTRACT

An electric machine (101) for use in an aircraft is shown. The electric machine comprises a casing (104) containing electromechanical components, a shaft (106) which extends outside of the casing, a seal (107) to seal the casing around the shaft, and a depressurisation system (102) configured to depressurise the casing below an external pressure to prevent electrical breakdown within gas in the casing.

6 Claims, 3 Drawing Sheets

(56) References Cited

U.S. PATENT DOCUMENTS

| | | | |
|---|---|---|---|
| 8,810,098 B2* | 8/2014 | Bright | H02K 19/106 310/103 |
| 9,083,207 B1 | 7/2015 | Veltri et al. | |
| 2002/0190722 A1* | 12/2002 | Singh | G01N 27/92 324/459 |
| 2003/0152459 A1 | 8/2003 | Gliebe | |
| 2007/0031078 A1 | 2/2007 | Hackett | |
| 2009/0127379 A1* | 5/2009 | Lugg | B64C 29/0066 244/12.3 |
| 2010/0083669 A1 | 4/2010 | Foster et al. | |
| 2010/0139776 A1 | 6/2010 | Auber | |
| 2010/0181861 A1 | 7/2010 | Takamatsu et al. | |
| 2010/0294374 A1 | 11/2010 | Sears et al. | |
| 2012/0227389 A1 | 9/2012 | Hinderks | |
| 2013/0126669 A1* | 5/2013 | Hamann | B64C 27/12 244/60 |
| 2013/0170961 A1 | 7/2013 | Meucci et al. | |
| 2015/0318760 A1 | 11/2015 | Veltri et al. | |
| 2016/0355272 A1 | 12/2016 | Moxon | |
| 2018/0127103 A1* | 5/2018 | Cantemir | H02K 3/12 |

FOREIGN PATENT DOCUMENTS

| | | | |
|---|---|---|---|
| EP | 2 631 489 A1 | | 8/2013 |
| GB | 583798 | | 6/1943 |
| GB | 583798 A | | 12/1946 |
| GB | 718200 | | 11/1954 |
| JP | 2005209791 A | * | 8/2005 |
| JP | 2016-75285 A | | 5/2016 |

OTHER PUBLICATIONS

Jul. 25, 2019 Office Action issued in European Patent Application No. 18 170 239.0.
U.S. Appl. No. 15/984,557, filed May 21, 2018 in the name of Razak, A.
U.S. Appl. No. 15/984,544, filed May 21, 2018 in the name of Razak, A.
U.S. Appl. No. 15/984,552, filed May 21, 2018 in the name of Razak, A.
Apr. 2, 2020 Office Action issued in U.S. Appl. No. 15/984,544.
Apr. 2, 2020 Office Action issued in U.S. Appl. No. 15/984,552.
Oct. 13, 2020 Office Action issued in U.S. Appl. No. 15/984,544.
Oct. 29, 2020 Office Action issued in European Patent Application No. 18 170 236.6.
Jul. 9, 2020 Office Action Issued in U.S. Appl. No. 15/984,557.
Dec. 23, 2020 Office Action issued in U.S. Appl. No. 15/984,557.
Mar. 29, 2021 Office Action issued in U.S. Appl. No. 15/984,544.
Apr. 21, 2021 Office Action issued in U.S. Appl. No. 15/984,557.
Nov. 8, 2021 Office Action issued in European Patent Application No. 18 170 236.6.
Sep. 28, 2021 Office Action issued in Chinese Patent Application No. 201810507924.9.
Jan. 20, 2022 Office Action issued in U.S. Appl. No. 15/984,557.
Jan. 3, 2022 Notice of Allowance issued in U.S. Appl. No. 15/984,544.
May 10, 2022 Office Action issued in U.S. Appl. No. 15/984,557.
May 6, 2022 Office Action issued in Chinese Patent Application No. 201810507921.5.
Sep. 15, 2021 Office Action issued in U.S. Appl. No. 15/984,557.
Oct. 5, 2021 Office Action issued in U.S. Appl. No. 15/984,544.

* cited by examiner

PREVENTING ELECTRICAL BREAKDOWN

CROSS-REFERENCE TO RELATED APPLICATION

This application is based upon, and claims the benefit of priority from UK Patent Application No. 1708297.5, filed on 24 May 2017, the entire contents of which are hereby incorporated by reference.

TECHNICAL FIELD

This disclosure relates to the prevention of electrical arcing in electric machines in gaseous environments in which electrical breakdown may occur.

BACKGROUND

At sea level, the dielectric strength of air is typically in the region of megavolts. However, in regions of low air pressure, such as experienced by aircraft at cruise altitude, the dielectric strength may drop to the order of only hundreds of volts.

Electric machines (a term which will be appreciated encompasses electric motors, electric generators and other electromagnetic machines and combinations thereof) are typically subjected to voltage derating as altitude increases to prevent the likelihood of electrical breakdown and the attendant phenomena such as arcing and corona, which may cause catastrophic failure modes.

Current thought suggests that electric machines will play an increasingly important role in efforts to reduce fuel consumption of aircraft, possibly by being embedded in hybrid gas turbine engines or by forming part of a distributed propulsion system. Due to the thrust demand placed upon the propulsion system and the necessarily high voltage requirement of the electric machines in such applications, it may not be possible to circumvent the issue by simply moving to a voltage regime which will not exceed the breakdown voltage.

Other measures to mitigate the risk of electrical breakdown in electric machines are therefore required.

SUMMARY

The present disclosure is directed towards an electric machine for use in an aircraft, and an aircraft comprising the same.

The electric machine comprises a casing containing electromechanical components, a shaft which extends outside of the casing, a seal to seal the casing around the shaft, and a depressurisation system configured to depressurise the casing below an external gas pressure to prevent electrical breakdown within the gas the casing.

In this way, the components liable to be damaged by electrical breakdown phenomena such as arcing and corona are sealed in a casing depressurised by the depressurisation system, and work may be performed by the electric machine upon external systems via its shaft.

The electric machine may be configured as an electric motor or an electric generator, and may operate using alternating or direct current.

The seal may comprise a labyrinth seal or a dry gas seal, or combination of the two.

When installed in an aircraft, the depressurisation system will operate to reduce the pressure inside the casing of the electric machine below the external gas pressure. Given typical cruise altitudes, the external gas pressure will be low and thus the breakdown voltage will also be low. This may lead to electrical breakdown events. Further reduction of the gas pressure within the casing, however, results in a greater mean free path between molecules within the gas within the casing, thereby reducing the likelihood of collisions. This therefore increases the voltage required for electron avalanche initiation to a point greater than the peak operational voltage within the casing, thereby preventing electrical breakdown.

In an embodiment, the electric machine may form part of an engine on the aircraft.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
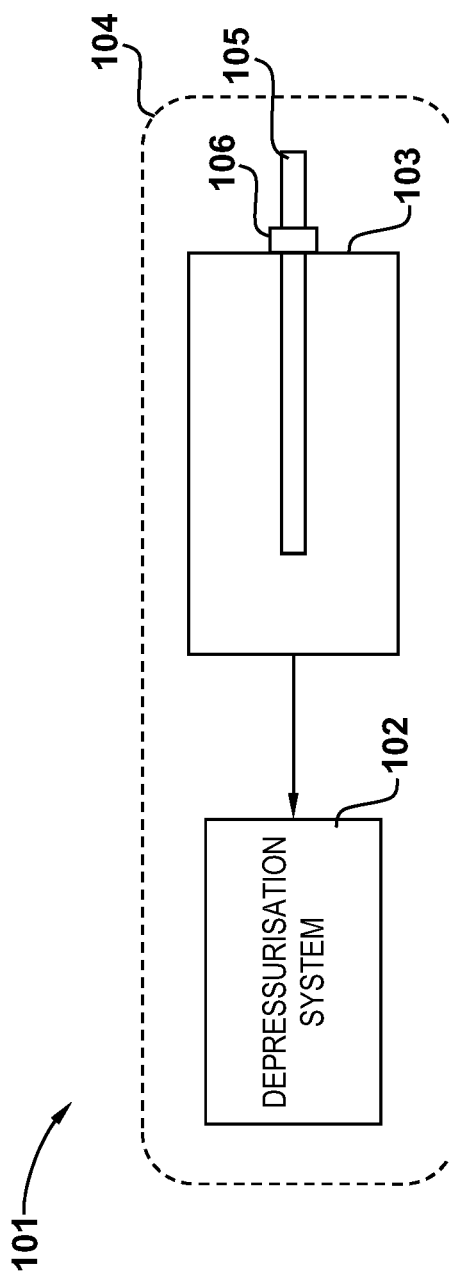
FIG. 1 shows block diagram of an electric machine according to the present disclosure.

A block diagram illustrating an embodiment is shown in FIG. 1, in which an electric machine is shown generally at 101.

The electric machine 101 comprises a depressurisation system 102. The depressurisation system 102 operates to depressurise a casing 103 of the electric machine 101 below an external pressure of the environment 104 in which the electric machine 101 is located.

The casing 103 houses electromechanical components (not shown) which effect the conversion of electrical power into work upon a shaft 105, or vice versa depending upon the assigned role of the electric machine 101, for example whether it is to operate as a motor or generator. It will be appreciated that the exact configuration of the electromechanical components within the casing 103 will differ according to the type of the electric machine as implemented, and thus may include coils, magnets, brushes, springs, commutators, power electronics, etc.

As the shaft extends outside of the casing, a seal 106 is provided to seal the casing around the shaft. Whilst the shaft 105 is shown extending out of only one end of the casing, it will be appreciated that the principles of the present disclosure may be extended to electric machines in which the shaft extends the full way through the casing, thus having what are commonly referred to as working and non-working ends. In such an implementation, another seal 106 would be provided to seal the casing around the two ends of the shaft.

As described previously, in one embodiment the seal 106 comprises a labyrinth seal. Labyrinth seals are characterised by a series of annular orifices used to seal a region of high pressure from one of low pressure. When gas flows from the high pressure side to the low pressure side of the seal, turbulence is caused by each annulus of the seal. Whilst this serves to minimise leakage, it does not entirely prevent it. Thus, in this example, the depressurisation system 102 operates to maintain the pressure in the casing 103 despite any leakage from environment 104 through the labyrinth seal and into the casing 103.

In an alternative embodiment, the seal 106 comprises a dry gas seal. Such seals feature zones between the stationary face of the casing and rotating face of the shaft, into which gas is pumped. When the pressure of gas in these zones exceeds the static pressure holding the faces together, the faces separate by a thin layer of gas. Dry gas seals are supplied gas at pressure via an inlet, and have an outlet for seal gas to be vented. As the zones are small, the pressure in them tends to be greater than that in the environment 104, and thus there is little leakage of gas from environment 104 through the seal 106 and into the casing 103 in such an implementation.

It will of course be appreciated that any appropriate type of seal or combination of seals may be used to prevent substantial ingress of air from the environment 104 into the casing 103.

It will be apparent that the degree of vacuum required within the casing 103 is dependent upon, with respect to any two electrodes therein, the peak operational potential difference between them, and the distance between them. Paschen's law may therefore be used to obtain, given a peak operational voltage, the maximum permitted product of pressure and distance between electrodes to prevent electrical breakdown, and therefore arcing, corona, etc.

Figure 2:
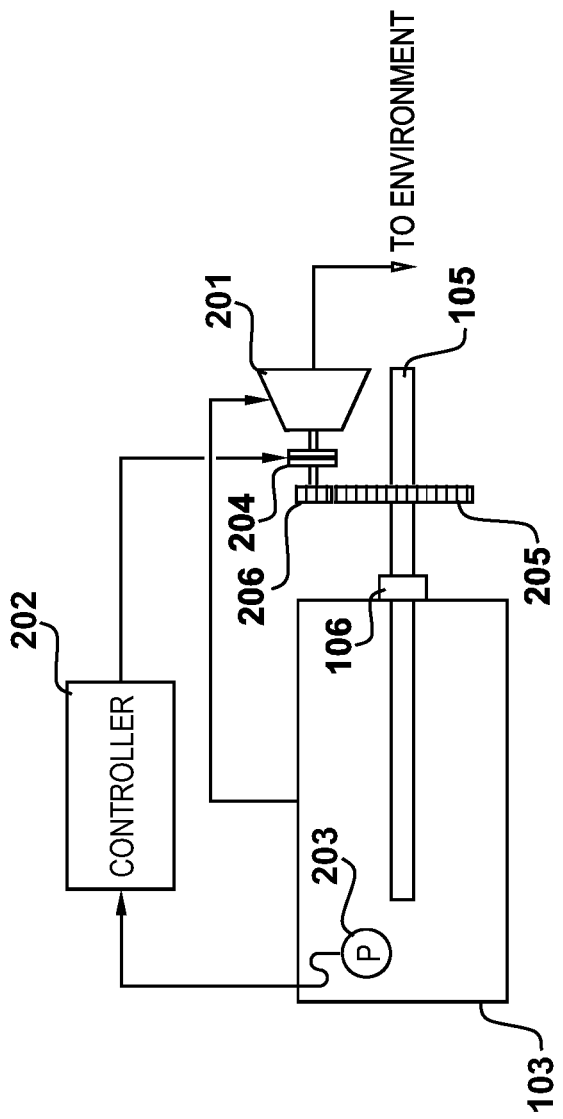
FIG. 2 shows a way of implementing the electric machine of FIG. 1.

A practical approach to implementing the electric machine of FIG. 1, is shown in FIG. 2.

In this example, the depressurisation system 102 comprises a vacuum pump 201 driven by the shaft 105. In the present embodiment, the vacuum pump 201 is a positive-displacement vacuum pump. In a specific embodiment, the positive-displacement pump is a rotary vane pump. However, it will be appreciated that the pump may be any other type of positive-displacement device such as a Roots blower.

In an alternative implementation, the vacuum pump is a centrifugal-type vacuum pump such as a radial inflow pump, or any other suitable type of vacuum pump. In addition, the vacuum pump may be multi-stage.

In order to maintain the pressure in the casing 103 at a level sufficient to prevent electrical breakdown, in the present example a controller 202 and a pressure sensor 203 within the casing are provided. The pressure sensor 203 is configured to provide the controller 203 with a signal indicative of the pressure therein, which the controller 202 is configured to utilise to control operation of the vacuum pump by means of a clutch 204. In the present example, the clutch 204 is actuated by a solenoid (not shown) connected with the controller 202, but it will be appreciated that other arrangements are possible to achieve activation/deactivation of the vacuum pump 201.

In an example, the controller 202 is an analog controller configured to implement a prescribed control loop. Alternatively, the controller may be a digital controller with software-defined logic to achieve the desired control over the pressure in the casing 103. The controller in the latter case may form part of another sub-system in the wider installation the electric machine 101 forms part of.

The control loop in the present example operates to compare the current pressure within the casing 103 to a prescribed threshold, above which electrical breakdown may occur. If the current pressure is determined to be above the threshold, the vacuum pump is enabled (i.e. the controller 202 allows to evacuate the casing 103) by engaging the clutch 204. If the current pressure is determined to be below the threshold, the vacuum pump is disabled by disengaging the clutch 204 (i.e. the controller 202 prevents it from evacuating the casing 103).

In a specific embodiment, a degree of hysteresis is included in the control loop to prevent over-actuation of the clutch 204 and vacuum pump 201. In this way, the vacuum pump 201 is only disabled once the pressure in the casing 103 is below the threshold pressure, less a lag value. As gas enters the casing 103, the pressure will rise and approach the threshold, leading to the vacuum pump 201 being enabled by the controller 202 to depressurise the casing 103. Such a control loop may be implemented using a Schmitt trigger or similar, or as one or more conditional statements in a software implementation.

The vacuum pump 201 is, in the present example, geared to the shaft 105 in order to drive the pump at the requisite angular rate to evacuate the casing 103. In the present example, this is achieved by a combination of a gear 205 on the shaft 105 meshed with a pinion 206 to drive the vacuum pump 201 via the clutch 204. It will be appreciated that the gear ratio will be in practice be dependent upon a combination of the angular rate required for the vacuum pump 201, and the operational rate of the electric machine 101. In a specific embodiment, the gear system used to connect the vacuum pump to the shaft is a magnetic gear.

In a further variation, the vacuum pump 201 may instead be geared to the shaft using a variable transmission, possibly a variable magnetic gear. In this way, the clutch 204 may be omitted, and the vacuum pump's speed and therefore pressure ratio varied by the controller 202 to maintain the pressure in the casing 103 at a fixed value, or within an acceptable defined range.

Gearing may be omitted, of course, if the electric machine 101 is to operate at same angular rate as required by the vacuum pump 201.

Figure 3:
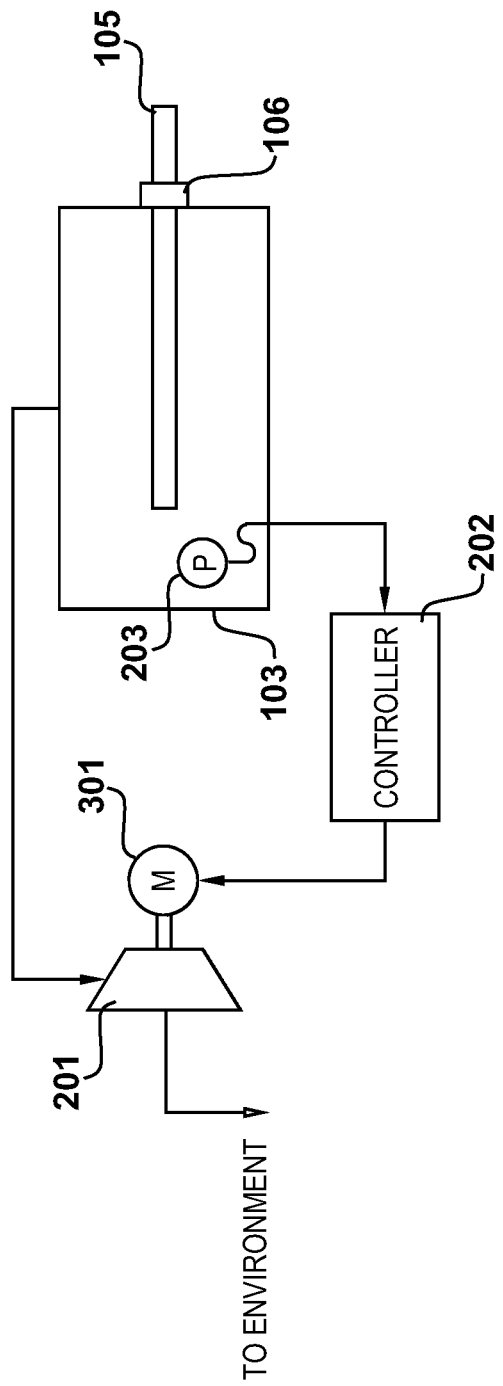
FIG. 3 shows another way of implementing the electric machine of FIG. 1.

Another approach to implementing the electric machine of FIG. 1, is illustrated in FIG. 3.

In this example, the depressurisation system 102 comprises vacuum pump 201, but in an electrically-driven configuration in which it is driven by a motor 301.

In this embodiment the motor 301 operates under the control of controller 202 which, in a similar way as described previously with reference to FIG. 2, may either enable or disable it in response to the output of pressure sensor 203 in the casing 103. Alternatively, as described previously, the controller 202 may vary the speed of the motor 301 so as to maintain the pressure in the casing 103 at a fixed value or within an acceptable defined range.

The motor 301 in this example operates at a much lower voltage than the electromechanical components in the casing 103. In this way, it is able to operate in low pressure environments such as may be encountered at aircraft cruise altitude without experiencing electrical breakdown, whereas breakdown could occur between the components in the casing 103 without depressurisation due to the higher voltages therein. Of course, it will be understood that the motor 301 could, in an alternative embodiment, be itself depressurised should electrical breakdown be possible due to its specification and operating environment.

One benefit of using the arrangement shown in FIG. 3 is that, prior to starting the electric machine 101, the casing 103 may be depressurised by the vacuum pump 201 driven by the motor 301. This can be of particular advantage should the electric machine 101 form part of an on-demand system in an aircraft in which it would not be running constantly. Further, it may be of advantage should the electric machine 101 form part of a wider system that is only started and used in low-pressure environments, rather than being started at, say, sea level and transitioning to a higher altitude.

Lastly, it will be appreciated that the electric machine 101 of the present disclosure and the principles it embodies may be used in any gaseous environment which, when combined with the specification of the electromechanical components within the casing 104, is liable to cause electrical breakdown therein. This may be anticipated by application of Paschen's law. Thus, in terms of the parameters that may cause this, the possibility of electrical breakdown occurring may be ascribed to one or more of the external gas pressure within the environment 105, the peak voltages within the casing 104, and/or the minimum distance between electrodes within the casing 104. Thus, for example, the electric machine 101 may indeed be used in applications at, say, standard temperature and pressure, if the peak voltage and minimum distance are such that electrical breakdown may still occur.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. A system comprising:
    an aircraft;
    an engine that powers the aircraft;
    an electric machine, said electric machine forming a part of the engine and comprising:
        a casing that houses a motor;
        a shaft which extends from an interior of the casing to an exterior of the casing;
        a seal to seal the casing around the shaft;
        a depressurisation system configured to depressurise the casing, to an operational pressure that is (i) below an external gas pressure and (ii) sufficient to prevent electrical breakdown within gas in the casing, the operational pressure being further defined as (iii) a pressure level for atmospheric air that is on a left-hand side of a graph of a Paschen's law curve for the atmospheric air, the left-hand side encompassing pressures lower than an inflection point present in the Paschen's law curve for the atmospheric air;
        a pressure sensor configured to output an indication of the gas pressure within the casing; and
        a controller configured to control the depressurisation system, the controller being further configured to depressurise the casing to the operational pressure prior to the electric machine starting operation,
    wherein the electric machine is configured to power the engine of the aircraft intermittently and on-demand while the casing is depressurized to the operational pressure, and
    wherein the casing is sealed via the seal such that ingress of air into the casing from an external environment is prevented, and a portion of the shaft is disposed in the interior of the casing that is depressurized,
    wherein the depressurization system comprises a vacuum pump, and
    the controller is configured to control the vacuum pump in response to the output of the pressure sensor to vary a speed of the vacuum pump to maintain the pressure within the casing at the operational pressure.

2. The system of claim 1, wherein the seal comprises one or more of:
    a labyrinth seal; or
    a dry gas seal.

3. The system of claim 1, wherein the controller is configured to:
    determine that the pressure within the casing has risen above a threshold, and allow the vacuum pump to evacuate the casing; and
    determine that the pressure within the casing has dropped below the threshold, and prevent the vacuum pump from evacuating the casing.

4. The system of claim 1, wherein the seal is disposed on a circumference of the shaft and configured to seal the casing at a junction between the circumference of the shaft and the casing.

5. The system of claim 1, wherein the vacuum pump is a positive-displacement vacuum pump.

6. The system of claim 1, wherein the vacuum pump is driven electrically.

* * * * *